(12) United States Patent
Boulanger et al.

(10) Patent No.: US 11,611,603 B2
(45) Date of Patent: Mar. 21, 2023

(54) APPARATUS AND METHOD FOR TRANSMITTING MULTIPLE ON-DEMAND AUDIO STREAMS LOCALLY TO WEB-ENABLED DEVICES

(71) Applicant: IC Events Inc., Montreal (CA)

(72) Inventors: Sebastien Boulanger, Montreal (CA); Kevin Villeneuve, Montreal (CA); Alexandre Brisson, Montreal (CA)

(73) Assignee: IC EVENTS INC., Montreal (CA)

( * ) Notice: Subject to any disclaimer, the term of this patent is extended or adjusted under 35 U.S.C. 154(b) by 0 days.

(21) Appl. No.: 17/193,043

(22) Filed: Mar. 5, 2021

(65) Prior Publication Data

US 2021/0281627 A1 Sep. 9, 2021

(30) Foreign Application Priority Data

Mar. 6, 2020 (CA) ..................................... 3074974

(51) Int. Cl.
*H04L 65/65* (2022.01)
*H04L 12/54* (2022.01)
*H04L 65/80* (2022.01)
*H04L 12/70* (2013.01)

(52) U.S. Cl.
CPC .......... *H04L 65/65* (2022.05); *H04L 12/5601* (2013.01); *H04L 65/80* (2013.01); *H04L 2012/5641* (2013.01)

(58) Field of Classification Search
CPC ... H04L 65/608; H04L 65/80; H04L 12/5601; H04L 2012/5641
See application file for complete search history.

(56) References Cited

U.S. PATENT DOCUMENTS

| | | | |
|---|---|---|---|
| 6,611,537 B1 * | 8/2003 | Edens ................ | H04L 12/2803 348/E7.05 |
| 8,675,853 B1 * | 3/2014 | Guilfoyle ............ | H04M 3/2281 379/202.01 |
| 9,270,724 B1 * | 2/2016 | Morgan .............. | H04L 65/4084 |
| 10,887,033 B1 * | 1/2021 | Tessmann ............. | H04H 60/04 |
| 2003/0083024 A1 * | 5/2003 | Richenstein .......... | H04H 60/04 455/99 |
| 2003/0206549 A1 * | 11/2003 | Mody ................... | H04L 65/608 370/390 |
| 2008/0165989 A1 * | 7/2008 | Seil ...................... | G11B 27/034 381/119 |
| 2012/0237056 A1 * | 9/2012 | Emlinger ............. | H04B 15/005 381/94.5 |

(Continued)

FOREIGN PATENT DOCUMENTS

| | | | |
|---|---|---|---|
| CN | 102192765 A | * | 9/2011 |
| CN | 112783481 A | * | 5/2021 |
| JP | 2007053421 A | * | 3/2007 |

*Primary Examiner* — Jonathan A Bui
(74) *Attorney, Agent, or Firm* — Ware, Fressola, Maguire & Barber LLP

(57) ABSTRACT

An apparatus and method for transmitting multiple on-demand audio streams locally to web-enabled user devices. Primarily usable for local audio acquisition and instant redistribution in conference halls with translation booths and stadiums with commentators, the technology is scalable and can be tailored to suit any local acquisition and distribution of both digital and analog audio signals. The technology is reliant on the local network configuration and wireless coverage.

11 Claims, 3 Drawing Sheets

(56) References Cited

U.S. PATENT DOCUMENTS

| | | | |
|---|---|---|---|
| 2012/0311642 A1* | 12/2012 | Ginn | H04N 21/8106 |
| | | | 725/62 |
| 2013/0163580 A1* | 6/2013 | Vass | H04L 65/103 |
| | | | 370/352 |
| 2014/0069261 A1* | 3/2014 | Tsai | G10H 1/361 |
| | | | 84/610 |
| 2015/0333511 A1* | 11/2015 | Barnette | G06F 1/30 |
| | | | 361/95 |
| 2016/0266867 A1* | 9/2016 | Olesh | G10H 1/0008 |
| 2016/0299800 A1* | 10/2016 | Cleary | G06F 16/24569 |
| 2016/0352708 A1* | 12/2016 | Fer | G06F 16/22 |
| 2017/0105039 A1* | 4/2017 | Rivkin | G10L 19/008 |
| 2017/0215056 A1* | 7/2017 | Edge | H04J 11/00 |
| 2019/0238575 A1* | 8/2019 | Hodgman | H04L 63/20 |

\* cited by examiner

APPARATUS AND METHOD FOR TRANSMITTING MULTIPLE ON-DEMAND AUDIO STREAMS LOCALLY TO WEB-ENABLED DEVICES

TECHNICAL FIELD

The present invention relates to techniques for streaming digital audio content to web-enabled devices.

BACKGROUND

Standard local audio transmission methods include RF (radio frequency) and IR (infra-red) solutions to broadcast one or multiple audio streams to connected receiving devices and/or headsets. However, these widely used methods have many drawbacks.

First, they are poorly scalable, as both use emitters to distribute the signals and have upper limits on the number of connected devices they can have at once per emitter.

Second, the equipment is very expensive, and needs to be tested, cleaned and configured prior to each use.

Third, installation is complex and requires careful planning and prior testing.

Fourth, both IR and RF emitters and transmitters are prone to interference from other signals, structures, ambient light or sunlight.

Fifthly, IR and RF technologies require specialized headsets or dedicated hearing devices.

Sixthly, prior-art technologies typically require a dedicated application be downloaded and installed on the user's device in order to function.

Accordingly, a new technology that overcomes one or more of these drawbacks would be highly desirable.

SUMMARY

In general, the present invention provides an audio-streaming apparatus and a method of streaming audio content to multiple web-enabled devices.

Embodiments of the present invention provide an audio-streaming apparatus and method that seek to replace, or improve upon, prior-art audio transmission systems and methods. The embodiments of the invention provide advantages over the prior art, such as ease of installation, scalability, customizability and affordability.

One inventive aspect of the disclosure is an apparatus for transmitting multiple on-demand audio streams locally to web-enabled devices. The apparatus comprises a power supply, a microcomputer powered by the power supply, analog audio input ports connected to the acquisition card for receiving analog audio signals, ground-loop noise isolators connected to each of the audio input ports for reducing noise in each of the analog audio signals, an audio acquisition card connected to the microcomputer for digitizing the analog audio signals, and a router connected to the microcomputer and powered by the power supply, the router having two network ports.

Another inventive aspect of the disclosure is a method of transmitting multiple on-demand audio streams locally to web-enabled devices. The method comprises steps, acts or operations of receiving analog audio signals via analog audio input ports, filtering and combining the analog audio signals using ground-loop noise isolators connected to each of the audio input ports, digitizing the analog audio signals using an audio acquisition card connected to the ground-loop noise isolators, transcoding digitized signals into a Real-time Transport Protocol (RTP) audio stream, and wirelessly streaming the RTP audio stream via Wi-Fi to the web-enabled devices.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Disclosed herein are various embodiments of a method and apparatus for transmitting multiple on-demand audio streams locally to web-enabled devices. Primarily used for local audio acquisition and instant redistribution in conference halls with translation booths and stadiums with commentators, the technology is scalable and can be tailored to suit any local acquisition and distribution of both digital and analog audio signals. The technology is reliant on the local network configuration and wireless coverage.

Figure 1:
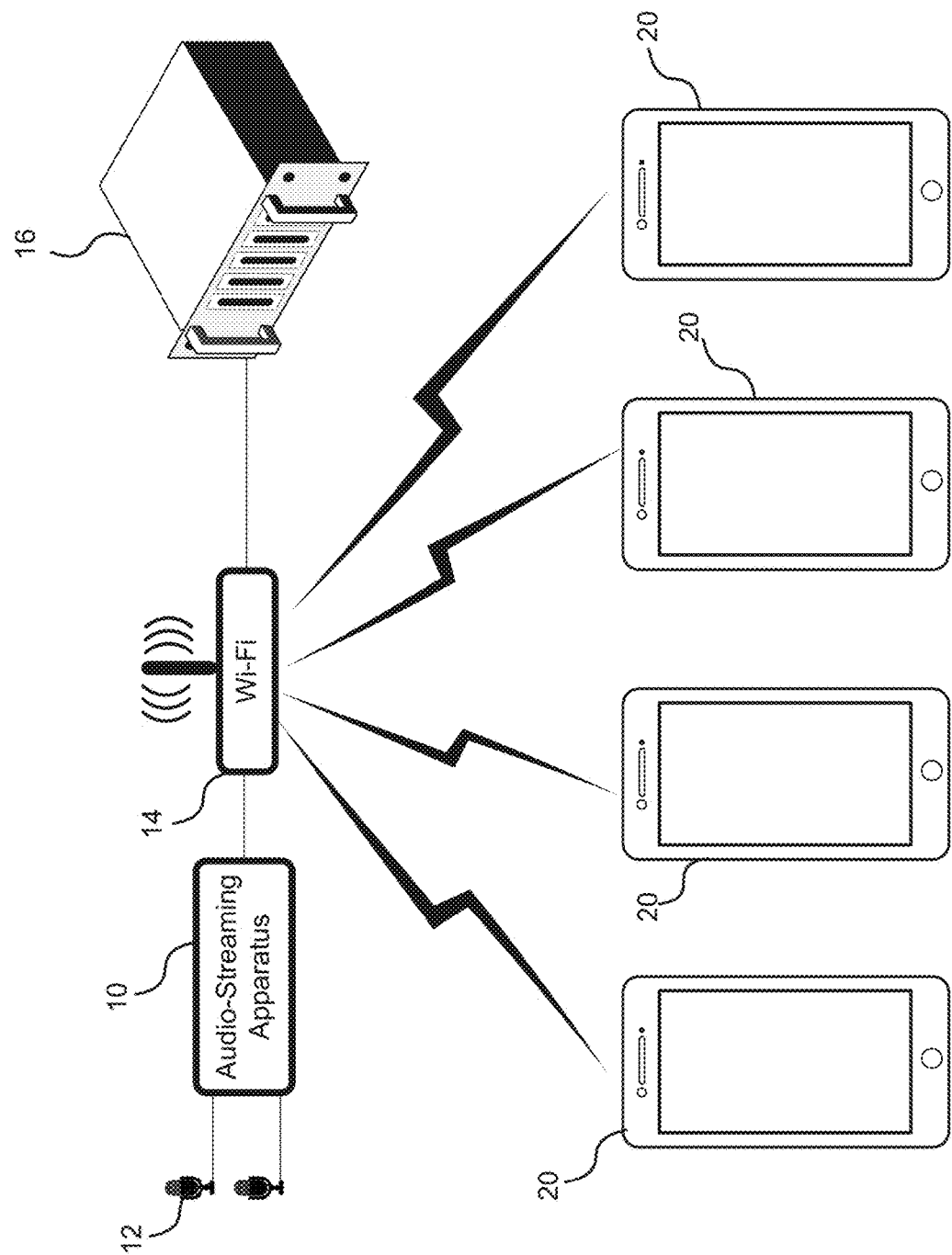
FIG. 1 depicts a system for audio streaming in accordance with an embodiment of the present invention, the system having an apparatus and a plurality of web-enabled devices.

FIG. 1 depicts a system for audio streaming in accordance with an embodiment of the present invention. The system includes a novel audio-streaming apparatus 10 denoted by reference numeral 10 and a plurality of web-enabled devices 20 denoted by reference numerals 20. The web-enabled devices may be mobile devices, smart phones, tablets, laptops, or any functionally equivalent electronic devices. Although only four devices are illustrated in FIG. 1, it will be appreciated that the apparatus can stream audio to a large number of devices. For example, in one implementation, the apparatus can individually stream audio to over 10,000 concurrent connections. In other implementations, the apparatus can be configured above this soft limit.

The system of FIG. 1 includes a Wi-Fi router, hub or hotspot 14 that communicates wirelessly with the web-enabled devices 20. The web-enabled devices 20 are able to access web data that is hosted and served by a server 16. The system utilizes the wireless coverage provided by the Wi-Fi router to stream the audio content to the web-enabled devices 20. The web-enabled devices 20 may play the streamed audio content via a web browser's audio player. The web-enabled devices 20 may output the audio to headphones, earphones or the device's speaker.

In most embodiments, the audio-streaming apparatus denoted by reference numeral 10 may be constructed as a single unit with an enclosure. The single unit can easily be installed within a standard rackmount, on a table, or anywhere else within working distance of the analog audio source. In the illustrated embodiment, the apparatus 10 includes a power supply 1. For example, the power supply may be a 24V power supply although it will be appreciated that a different voltage power supply may be used in other implementations. The power supply is connected to a power port 2. The power port may be, for example, an Integrated Drive Electronics (IDE) power port. The apparatus includes a fused power entry module.

In the illustrated embodiment, the apparatus includes an audio acquisition card 3 for analog-to-digital conversion of an analog audio signal into a digital audio signal. The audio-streaming apparatus illustrated in FIG. 2 includes a router 4. The router may be, for example, a 5-port router although it will be appreciated that in other implementations the number of ports may be different.

Figure 2:
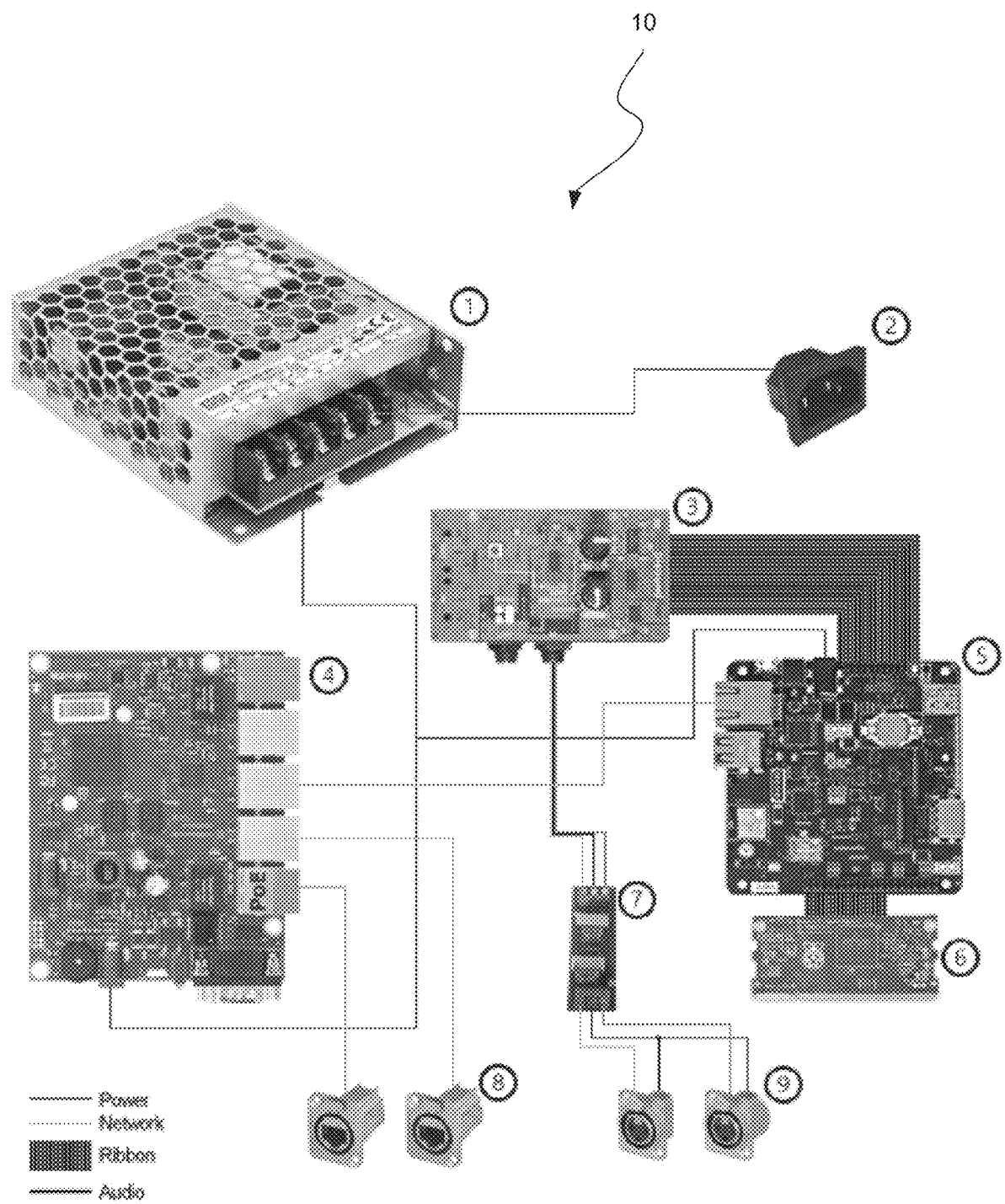
FIG. 2 depicts an apparatus for transmitting multiple on-demand audio streams locally to web-enabled devices in accordance with an embodiment of the present invention.

In the embodiment in FIG. 2, the audio-streaming apparatus comprises a microcomputer 5. The microcomputer includes, or is communicatively connected to, a computing module 6 by a connector, for example by a ribbon connector or equivalent. The computing module may be a central processing unit (CPU) or any functionally equivalent data processor.

In the embodiment illustrated in FIG. 2, the audio-streaming apparatus comprises a ground-loop noise isolator 7 for each of the analog inputs. Two ground-loop noise isolators 7 filter the respective analog audio signals and reduce noise in the audio signals. The ground-loop noise isolators include noise filters. Alternatively, the ground-loop noise isolators and noise filters are separate components.

In the embodiment illustrated, the audio-streaming apparatus includes two network ports 8 and multiples of two XLR3 analog audio-in ports 9. The ports 9 may be connected to the microphones 12.

The analog audio signal comes in from XLR ports in the apparatus. Two audio signal inputs are then processed through a paired ground-loop noise isolator, combined as a single stereo analog signal and moved on to the microcomputer's audio acquisition card. An audio transcoder, e.g. a custom build of FFmpeg or any other equivalent audio transcoder, splits the signals into two different local Real-time Transport Protocol (RTP) streams mapped to specific ports of the microcomputer, e.g. ports 5002 and 5003. The streams are then passed through a local WebRTC server.

In at least one embodiment, the audio-streaming apparatus is configured or programmed to update an online database with its credentials, connection times, connection count, local IP address and a timestamp at a determined time interval, e.g. every 15 seconds. Once the apparatus is connected to the internet, the online database will show the apparatus as active and pass the local IP address to the webpage whenever a client (i.e. web-enabled device 20) requests the audio stream.

The audio-streaming apparatus provides numerous advantages over the prior art. The audio-streaming apparatus is affordable and only needs to be tested once upon installation. The audio-streaming apparatus is self-updating, only needing servicing for physical breaks. The audio-streaming apparatus can also be configured remotely. Unlike prior-art technologies, no specialized headsets or dedicated hearing devices are required. The user may use any personal headphones or earbuds. Since the apparatus is web-based, there is no requirement for a dedicated application in order for the technology to function.

Figure 3:
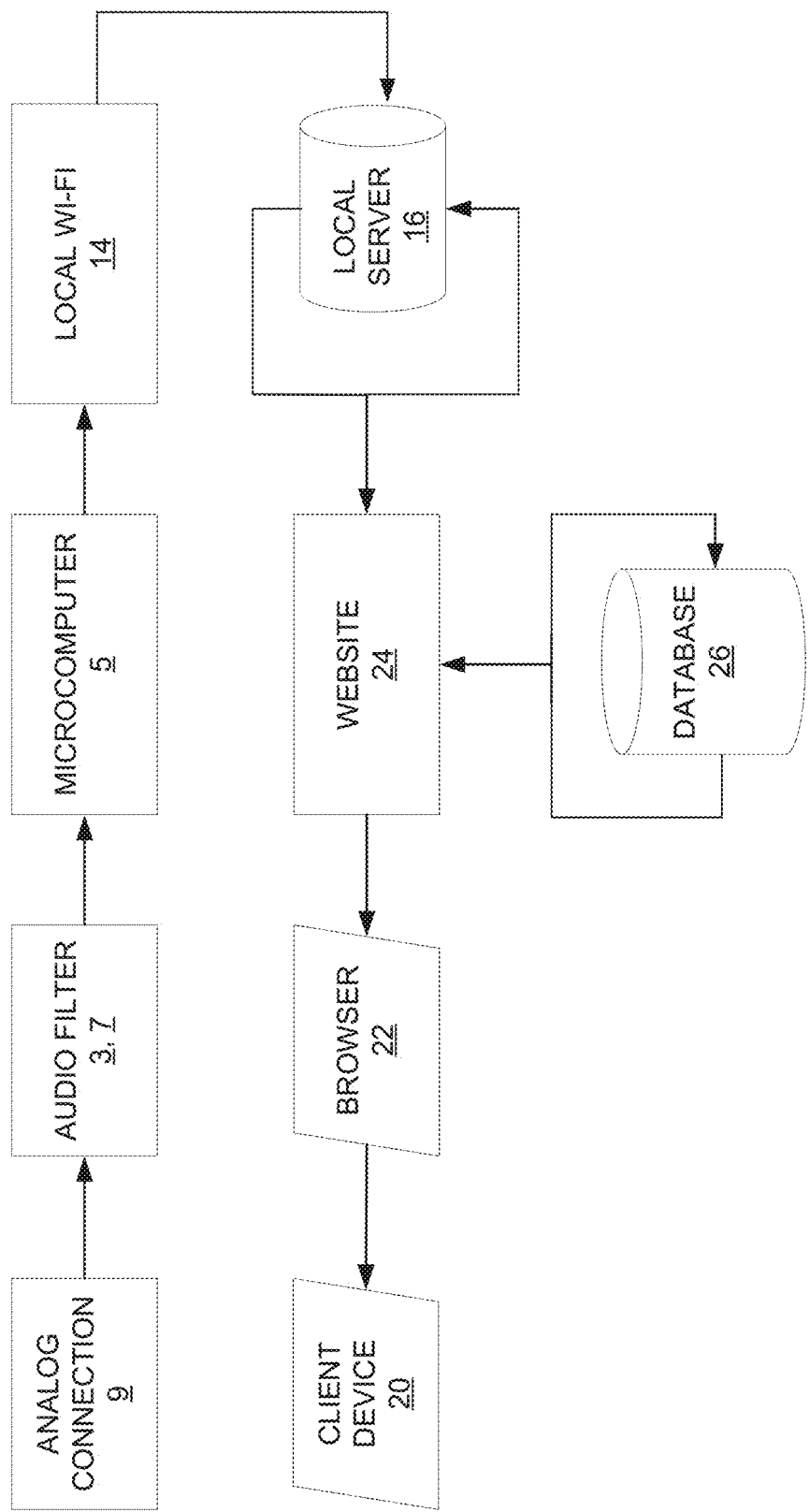
FIG. 3 depicts a method of transmitting multiple on-demand audio streams locally to web-enabled devices in accordance with an embodiment of the present invention.

FIG. 3 depicts a method of transmitting multiple on-demand audio streams locally to web-enabled devices 20 ("client devices") in accordance with an embodiment of the present invention. As depicted in FIG. 3, the analog connection 9 (analog audio-in ports 9) receive the analog signals and deliver these to an audio filter that includes the ground-loop noise isolators 7, noise filters and the audio acquisition card 3. Once filtered and digitized as a stereo signal, the digital stereo signal is processed by the microcomputer 5 to convert the digital signal into an RTP stream that is streamed by the Wi-Fi router 14 and server 16 via a website 24 (stored in a database 26) to a browser 22 of the client device, i.e. a web-enabled user device 20. The web-enabled user device (client device) 20 includes a device processor for executing a web browser, a device memory coupled to the device processor for storing data, applications, etc., and a Wi-Fi transceiver to receive data from the Wi-Fi router 14. The web-enabled user device also includes an audio output port which may be an output jack, socket or connector for a wired headset or earphones or a Bluetooth® interface for wirelessly pairing the device 20 to a wireless headset or earphones.

In operation, a user operating the web-enabled user device 20 connected to the local Wi-Fi router 14 loads up the event webpage (website 24) associated with the apparatus 10. This may be done by the user launching a web browser and naviating to the event webpage or by other means such as, for example, scanning a QR code, clicking on a hyperlink in an e-mail or text message received in response to registering for an event, such as a conference, symposium, course, lecture, etc. The webpage requests the local IP address of the apparatus, tests the connection to each apparatus associated with the event and, with the results, activates or deactivates the buttons for each stream. Once a user clicks on one of the active streams, the webpage will poll the local server 16 for a connection. The Wi-Fi router 14 will dedicate a port in a firewall of the Wi-Fi router for that client connection and start feeding audio data directly to the browser's audio player. In one embodiment, the audio data is not compressed or buffered for greater data transfer rates.

The microcomputer 5 encodes the converted digital signal in an audio coding format, e.g. Opus format or any other suitable format such as, for example, MP3, AAC, etc. The digital signal is then streamed locally to a streaming backbone as a real-time protocol (RTP) link. The digital signal is then pushed to connected users (i.e. to the web-enabled devices 20) unidirectionally through a simple webpage. Each connection opens a unicast port from the audio-streaming apparatus 10 to the web-enabled device 20 and uses a fixed data output rate, e.g. 48 kbps or any other suitable bitrate, although it will be appreciated that this data rate is just an example of one implementation. In at least some embodiments, all incomplete data frames are dropped, and no buffer is used to achieve real-time playback. Such an implementation enables high data transfer rates.

In one example implementation, by default, 5,000 concurrent connections are opened per stream, which can be increased in this example implementation to 15,000 with no major configuration changes. It will be appreciated that in most embodiments the limit can be increased by reconfiguration and/or hardware additions for a virtually unlimited amount of simultaneous users. The technology is thus highly scalable.

In most embodiments, the method requires the following for successful implementation: (i) client/venue/event audio output to be transported through XLR ports, (ii) wireline access for the audio-streaming apparatus, (iii) a local area network (LAN) Wi-Fi access point, (iv) and whitelisting by the local area network (LAN).

The method gives client access to the event portal which can be configured by the client for visual set-ups for one or multiple events by customizing the webpage with a logo, banner image and branding, color schemes, skin pre-sets. The method also enable collection of information pertaining to the event(s) such as anonymous usage analytics available during and after the event. The method may be used with a custom unique URL. As noted above, the web-enabled user device may be any suitable web-enabled device such as smartphone, a tablet, a desktop computer, a laptop computer or any other web enabled device.

These methods can be implemented in hardware, software, firmware or as any suitable combination thereof. That is, if implemented as software, the computer-readable medium comprises instructions in code which when loaded into memory and executed on a processor of a tablet or mobile device causes the tablet or mobile device to perform any of the foregoing method steps. These method steps may be implemented as software, i.e. as coded instructions stored on a computer readable medium which performs the foregoing steps when the computer readable medium is loaded into memory and executed by the microprocessor of the mobile device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. A system for transmitting multiple on-demand audio streams locally to web-enabled devices, the system comprising:
an apparatus including:
a fused power entry module;
a power supply;
a microcomputer powered by the power supply;
an audio acquisition card connected to the microcomputer;
analog audio input ports connected to a microphone and to the audio acquisition card for receiving analog audio signals which are digitized by the audio acquisition card to form digitized signals and which are transcoded by the microcomputer into a Real-time Transport Protocol (RTP) audio stream;
ground-loop noise isolators and noise filters connected to each of the audio input ports for reducing noise in each of the analog audio signals; and
a router connected to the microcomputer and powered by the power supply, the router having two network ports, wherein the router is configured to wirelessly stream the RTP audio stream via Wi-Fi to the web-enabled devices;
a server hosting an event webpage, the event webpage providing a link for browsers of the web-enabled devices to initiate wireless streaming of the RTP audio stream,
wherein the server requests a local IP address of the apparatus, tests a connection to the apparatus and activates or deactivates one or more buttons on the event webpage for the user to initiate the RTP stream, and
wherein the router dedicates a port in a firewall of the router for the connection and feeds audio data to audio players of the browsers of the web-enabled devices.

2. The system of claim 1 wherein the analog audio signals are combined into a single stereo analog signal.

3. The system of claim 1 wherein the power supply has a power port for receiving electrical power.

4. The system of claim 1 wherein the analog audio input ports are eXternal Line Return over 3 pins (XLR3) ports.

5. The system of claim 1 wherein the microcomputer executes Fast Forward Moving Pictures Expert Group (FFmpeg) software to generate the RTP audio stream.

6. A method of transmitting multiple on-demand audio streams locally to web-enabled devices, the method comprising steps of:
hosting an event webpage by a server, the event webpage providing a link for browsers of the web-enabled devices to initiate wireless streaming;
requesting by the server a local IP address of the apparatus, testing a connection to the apparatus and activating or deactivating one or more buttons on the event webpage for users to initiate wireless streaming;
dedicating by the router a port in a firewall of the router for the connection and feeding audio data to audio players of the browsers of the web-enabled devices by:
receiving analog audio signals via analog audio input ports that are connected to a microphone;
filtering the analog audio signals using ground-loop noise isolators connected to each of the audio input ports and then combining the analog audio signals into a stereo signal;
digitizing the stereo signal using an audio acquisition card connected to the ground-loop noise isolators to form a digitized signal;
transcoding the digitized signal into a Real-time Transport Protocol (RTP) audio stream; and
wirelessly streaming the RTP audio stream via Wi-Fi to the web-enabled devices.

7. The method of claim 6 comprising a step of connecting the web-enabled devices to a website hosted by a local server connected to a Wi-Fi router to initiate streaming of the RTP audio stream.

8. The method of claim 6 comprising a step of opening a unicast port to each of the web-enabled devices at a fixed data output rate.

9. The method of claim 8 further comprising a step of dropping incomplete data frames.

10. The method of claim 6 further comprising a step of updating an online database with credentials, connection times, connection count, local IP address and a timestamp at a predetermined time interval.

11. The method of claim 6 wherein the step of transcoding digitized signals is performed using Fast Forward Moving Pictures Expert Group (FFmpeg).

\* \* \* \* \*